Figure 1:
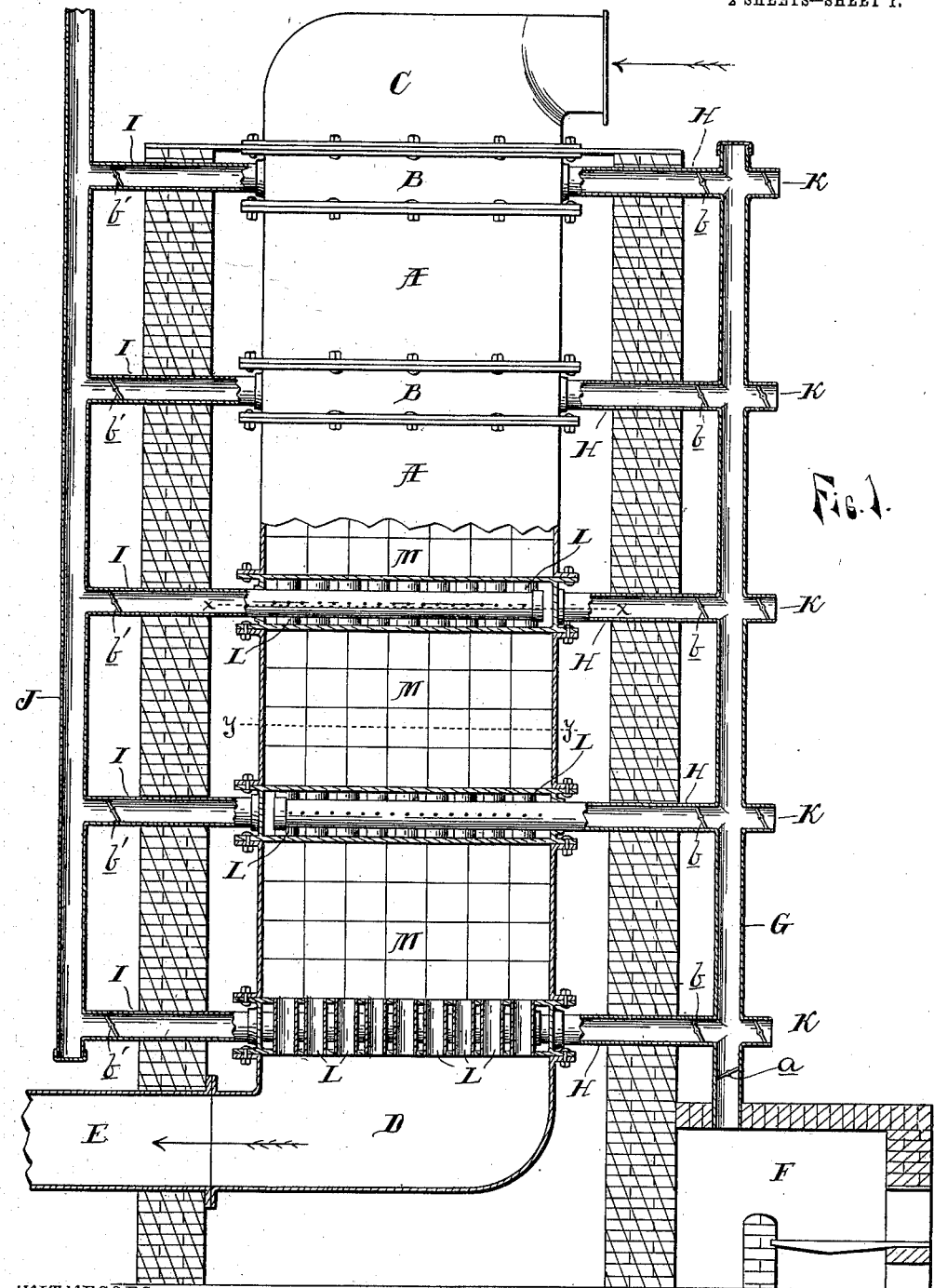

No. 731,758. PATENTED JUNE 23, 1903.
C. DAUB.
APPARATUS FOR MAKING SULFURIC ANHYDRID.
APPLICATION FILED MAR. 10, 1902.
NO MODEL. 2 SHEETS—SHEET 1.

WITNESSES. INVENTOR.
Carl Daub

Attorneys.

No. 731,758. PATENTED JUNE 23, 1903.
C. DAUB.
APPARATUS FOR MAKING SULFURIC ANHYDRID.
APPLICATION FILED MAR. 10, 1902.
NO MODEL. 2 SHEETS—SHEET 2.
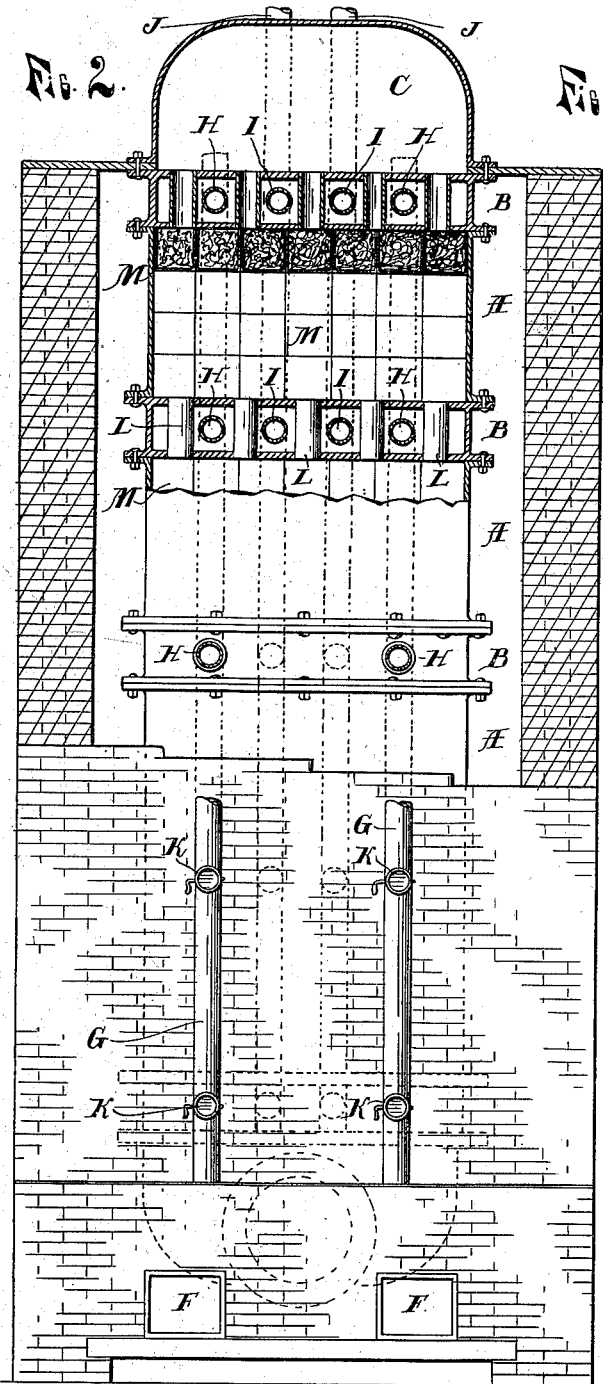
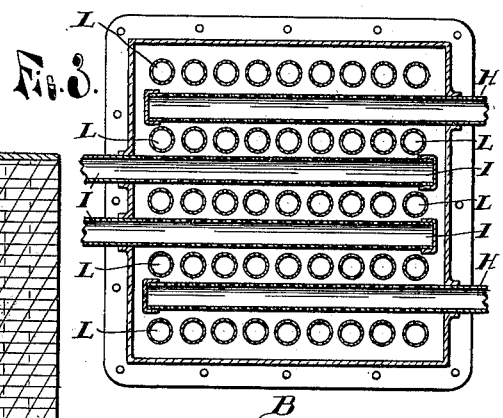
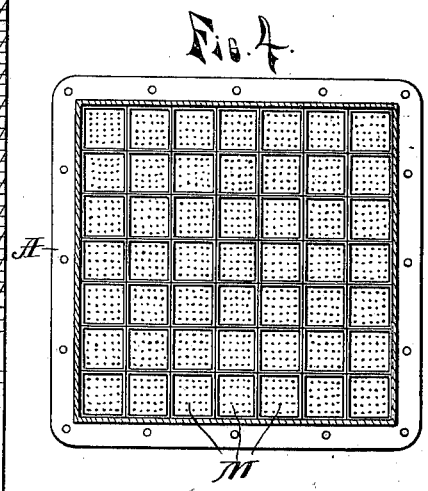

No. 731,758.

Patented June 23, 1903.

UNITED STATES PATENT OFFICE.

CARL DAUB, OF ANTWERP, BELGIUM, ASSIGNOR OF ONE-HALF TO JULIUS C. DEUTHER, OF DETROIT, MICHIGAN.

APPARATUS FOR MAKING SULFURIC ANHYDRID.

SPECIFICATION forming part of Letters Patent No. 731,758, dated June 23, 1903.

Application filed March 10, 1902. Serial No. 97,674. (No model.)

*To all whom it may concern:*

Be it known that I, CARL DAUB, a subject of the King of Belgium, residing at Antwerp, in the Province of Antwerp and Kingdom of Belgium, have invented certain new and useful Improvements in Apparatus for Making Sulfuric Anhydrid, of which the following is a specification, reference being had therein to the accompanying drawings.

This invention relates to apparatus for making sulfuric anhydrid by the method of passing a mixture of sulfur dioxid and oxygen through a contact substance. As chemical union by this method takes place only at an elevated temperature, provision has to be made to heat the gases to the temperature required. In making such provision, however, it has to be taken into consideration that the chemical reaction produces heat by itself, and if this were allowed to accumulate in the contact substance the latter would soon become overheated and instead of producing composition it would produce decomposition. The heat produced by reaction must therefore be prevented from accumulating in the contact substance; and to this end it is the object of my invention to keep this heat under such control that overheating is prevented, while at the same time it constitutes the source of heat for maintaining the gases and contact material at the elevated temperature required for useful work, thus dispensing with the necessity of any active participation of independent heating or cooling appliances during operation, while at the same time such means are ready at hand and form a corrective aid at any time should necessity arise for their use.

To this end my invention consists of an apparatus composed of alternately-arranged series of heating and contact chambers through which the gases pass, the heating-chambers provided with independent means for heating (or cooling) the gases and the contact-chambers adapted to provide a passage for the whole bulk of the gas conducted into the apparatus through contact material disposed in the contact-chamber in such manner that the gases and contact matter reciprocally maintain and equalize the temperature in the chamber and prevent local overheating, so that the whole contact matter is maintained in a state of useful activity, all as more fully hereinafter described, and shown in the accompanying drawings, in which—

Figure 1 is a vertical central section, partly in elevation, showing my apparatus as a whole. Fig. 2 is an elevation at right angles to the plane of section of Fig. 1 with parts of the apparatus shown in vertical section. Fig. 3 is a horizontal section on line $x$ $x$, Fig. 1. Fig. 4 is a horizontal section on line $y$ $y$, Fig 1.

The apparatus is composed of an alternate series of contact-chambers A and heating-chambers B, arranged in the form of a vertical column, which may be of circular or rectangular cross-section. On top the column is provided with an inlet-chamber C, formed with a suitable inlet for conducting the mixture of sulfur dioxid into the top of the apparatus, and on the bottom it is correspondingly provided with an outlet-chamber D, into which the product is discharged from the apparatus and passes off through a suitable outlet E. The column is also suitably incased in brickwork to prevent loss of heat from radiation.

F is a heating apparatus in which by the combustion of fuel in a combustion-chamber hot air or a mixture of hot air and gases is produced. The hot products from this heating apparatus are conducted into a riser-pipe G, from which it may be conducted through lateral inlet-pipes H into the heating-chambers B of the column. The chambers B are correspondingly provided with outlet-pipes I, through which the hot gases after passing through said heating-chambers are carried off into an escape-pipe J.

The riser-pipe G is provided with a valve $a$, and each of the inlet and outlet pipes H I are separately provided with valves $b$ $b'$, respectively, whereby the passage of the hot gases through the heating-chambers may be regulated. The riser-pipe is also preferably provided opposite each pipe H with valved inlet-openings K for the admission of atmospheric air. The pipes H I are preferably extended into the heating-chambers and provided with suitable perforations in their walls, the ends being closed.

Instead of one riser-pipe G and one escape-pipe J a plurality of each kind may be arranged, the drawings showing two riser-pipes G and two escape-pipes J.

The contact-chambers communicate with each other through vertical tubes L, secured in the heads of the heating-chambers, whereby they serve the additional purpose of stays to support the weight of the contact material in the contact-chamber. The contact material, which consists, as usual, of platinized asbestos, is inclosed in small perforated boxes M, formed of sheet-iron, and these boxes are placed, usually in superposed horizontal layers, in the contact-chambers, which for the purpose of charging and discharging may be provided with suitable manholes. (Not shown.)

In practice the apparatus is first brought up to the required heat by conducting the heated gases from the heater through the heating-chamber B. This preliminary heating is continued until the column is uniformly heated throughout. The further heating is then discontinued by closing the valves in the pipes H, and the apparatus is then in condition to begin the manufacture of sulfuric anhydrid by admitting the mixture of sulfur dioxid and oxygen in the inlet-chamber C. In passing through the apparatus the gases are subjected to the chemical action of the catalytic agent in the contact-chambers, and sulfuric anhydrid is produced.

It will be seen by the arrangement of the intermediate heating-chambers great facility is afforded to regulate the heat of the gases, as in case of the temperature being too low it may be raised by admitting hot gases from the heater into the heating-chambers, or in case of the temperature being too high cooling-currents may be admitted. My apparatus, however, by means of the boxes M affords special facilities for permitting the accumulation of heat in the contact material and for turning the heat created by the chemical reaction entirely into useful work without the use of either the heating or cooling appliances.

As platinized asbestos, which is the contact material used, is of fibrous nature, it is more easily disposed of by inclosing it into boxes than it would be by inclosing it into tubes, as in the present constructions, and by thus subdividing the contact material it becomes not only more effective, but the heat arising from the reaction has a better chance to equalize itself through the whole contact-chamber; further, it permits of the use of contact material of different strength—i. e., containing more or less of the active agent—as boxes containing material of lesser strength may be placed intermediate or adjacent to those containing material of greater strength, and thus the excess of heat generated in the latter will supply heat to the former, and thus maintain the proper temperature in the apparatus without danger of overheating.

By suitably arranging the boxes the gases after passing through boxes containing material of greater strength may be conducted through those of lesser strength, and thus the gases themselves may act as the heat-equalizing agent. Another way would be to leave spaces between the boxes or between the several layers, and thus afford additional facilities for the commingling of variously-heated currents of gases to produce equalization of heat, and thus preventing overheating of the contact substance. If additional heat is needed, it can be readily applied to any part of the apparatus by means of the heater.

The form of my apparatus also favors a closer observation to the skilled operator in that he can watch the temperature in the various parts closely and apply the proper remedy more expeditiously than in apparatus of the present constructions, and the results will be found to approach more nearly the theoretical output.

Having thus fully described my invention, what I claim is—

1. In an apparatus for the purpose described, the combination of a column formed with an inlet-chamber at the top and an outlet-chamber at the bottom, a series of contact-chambers and heating-chambers interposed between said inlet and outlet chambers, means for connecting the contact-chambers in series with each other, a heater having a riser connected thereto, branches connected to the heater and leading into the heating-chambers, an escape-pipe, with a series of horizontally-disposed pipes connected thereto, and leading into the heating-chambers on the sides opposite to the entrance of the said branches.

2. In an apparatus for the purpose described, the combination of contact-chambers and heating-chambers, with means extending into the heating-chambers on opposite sides thereof for heating said chambers and exhausting the heat, and a series of means in engagement with each other for containing the contact material located within the contact-chamber, said means being perforated.

3. In an apparatus for the purpose described, the combination of a contact-chamber having means for conducting a mixture of sulfur dioxid and oxygen through said chamber and a plurality of perforated metallic boxes of relatively small size compared with the contact-chamber, and containing the contact material, said boxes being disposed in the contact-chambers substantially as described.

4. In an apparatus for the purpose described, the combination of the alternating series of heating-chambers A and contact-chambers B arranged in a vertical column, the inlet and outlet chambers C, D, forming the top and bottom of the column respectively, the perforated boxes M in the contact-chambers containing the contact material, the pipes L passing through the heating-chambers and connecting the contact-chambers in series with each other and with the inlet and outlet chambers for the flow of the gases through said chambers, the heater F, the pipe G, from said heater, the pipes H, leading from the pipe G, into the heating-chambers, and the exit-pipes I from the heating-chambers.

5. In an apparatus for the purpose described, the combination of the alternating series of heating-chambers A, and contact-chambers B, arranged in vertical column, the inlet and outlet chambers C, D, forming the top and bottom of the column respectively, and the pipes L inclosed in the heating-chamber and connecting the contact-chambers in series with each other and with the inlet and outlet chambers, the heater F, riser-pipe G, provided with branches H, leading into the heating-chambers and with inlet branches K, valves in said pipes and the valved exit-pipes I from the heating-chambers.

6. An apparatus of the type set forth, consisting of a contact-chamber, with means for subjecting the latter to heat, and a plurality of foraminous boxes of less size than the contact-chamber disposed within the contact-chamber in the same horizontal plane.

7. In a contact apparatus, consisting of a contact-chamber, and heating-chambers disposed above and below the same, means for introducing sulfur dioxid into the contact-chamber, and a plurality of foraminous boxes nested within the contact-chamber, in contact with each other.

8. In a contact apparatus, a contact-chamber, means for conducting sulfur dioxid through said chamber and a series of independent containing means nested within the contact-chamber and separately inclosing the contact material within the walls of said means, said walls being perforated and in contact with each other whereby the heat generated by the contact material is diffused by said walls through the entire mass for the purpose of equalizing the temperature.

9. In an apparatus for the purpose described, the combination with a vertical series of contact-chambers, of contact material inclosed in relatively small perforated metallic containing vessels forming independent units disposed in said contact-chambers in superposed horizontal courses.

10. In a contact apparatus, the combination with a contact-chamber and means for heating the same, of contact material separately inclosed in perforated boxes nested within said contact-chamber.

11. In a contact apparatus, the combination with a contact-chamber, and means for heating the same, of perforated boxes nested within said contact-chamber and containing the contact material, the strength of said contact material being varied in different boxes as and for the purpose described.

In testimony whereof I affix my signature in presence of two subscribing witnesses.

CARL DAUB.

Witnesses:
G. DE LERS,
J. ALAERRN.